UNITED STATES PATENT OFFICE.

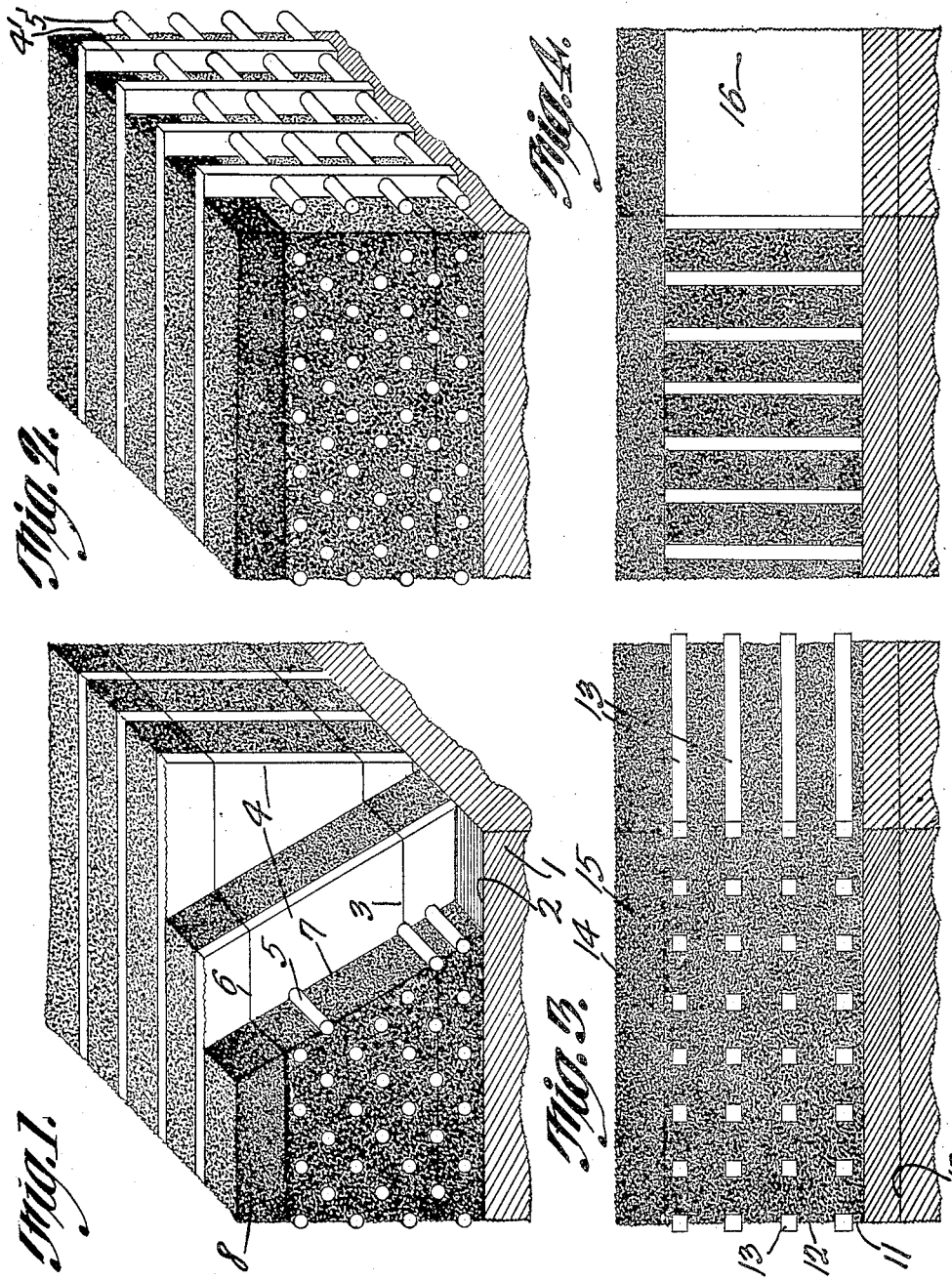

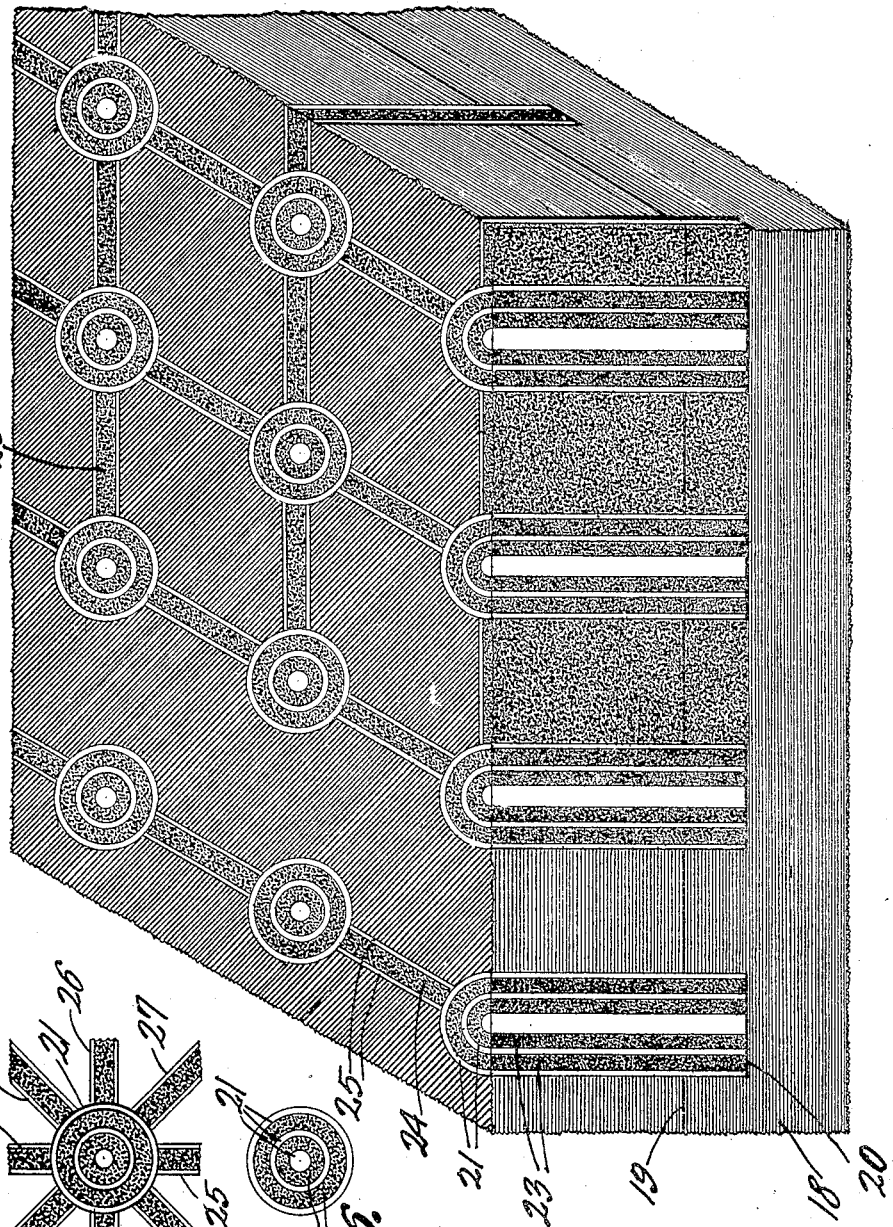

JOHN N. WINGETT, OF DENVER, COLORADO.

SYSTEM OF LAND PREPARATION FOR AGRICULTURE.

1,251,315.  Specification of Letters Patent.  Patented Dec. 25, 1917.

Application filed February 9, 1914. Serial No. 817,626.

*To all whom it may concern:*

Be it known that I, JOHN N. WINGETT, a citizen of the United States, residing at Denver, in the county of Denver and State of Colorado, have invented a new and useful System of Land Preparation for Agriculture, of which the following is a specification.

The present invention relates to improvements in a system of land preparation for agriculture, wherein the moisture within the earth and below a certain depth under the surface, is supplied to the surface by capillary attraction due to a breaking up of the ground to a point below the natural moisture line and the positioning in the broken ground of means which when acted upon by the rays of the sun causes the moisture to be supplied to the upper surface and thus to the plant life carried thereby.

A further object of the present invention, is the provision of a moisture supplying means constructed in the form of various shaped molds and of such materials as may be desired to supply the different chemicals needed in the soil, as for instance, phosphates, potash and nitrogen, such molds being so constructed as to readily adapt the soil for use in the cultivation of various yearly crops or for trees and orchards.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—

Figure 1 is a diagrammatic perspective view showing a portion of the earth with the present system applied thereto.

Fig. 2 is a similar view showing a slightly modified form of moisture supplying mold used in connection therewith.

Figs. 3 and 4 are similar views showing other modified forms of molds.

Fig. 5 is an enlarged detail perspective view of a form of mold used for orchard or tree planting.

Fig. 6 is a top plan view of one of the tree receiving pit forming molds.

Fig. 7 is a similar view of a modified form for accommodating trees that require a great quantity of moisture.

Referring to the drawings, and more particularly to Figs. 1, 2, 3 and 4, the earth 1 is broken up to the line 2, said line 2 being at a desired distance below the line 3 which is the natural moisture line of the earth. Disposed longitudinally of and in proper spaced relation to each other throughout the cultivated portions of the earth are a plurality of slabs or plates 4, the detailed construction of which will be set forth later on. These plates 4 constitute what I term moisture conveying members of the molds while disposed at right angles thereto and extending at a point from above the level 2 to a point below the level 6, which is the lowest point of cultivation for the soil, are a plurality of cross molds or sub-irrigators 5. As shown in Figs. 1 and 2, these sub-irrigators 5 and 5' are cylindrical while the moisture conveying members 4 and 4' are slabs. These slabs as clearly illustrated in Figs. 1 and 2 extend from the level 2 to the upper surface of the soil so that the sun's rays may act thereupon to produce the desired moisture conveying action and cause the moisture in the earth below the line 3 to be distributed upwardly and through the body of soil between the slabs 4 and incasing the bars 5 so that the upper surface above the level 6 or as at 7 and 8 will be properly permeated with the moisture.

In the form as shown in Fig. 3, the rectangular in cross section bars 13 are embedded in the broken soil 12 which is broken to the natural moisture level 11 slightly above the permanent moisture line 10. In this form, the moisture conveying members 4—4' are dispensed with and only the rectangular bars 13 are employed.

In the form shown in Fig. 4, the vertical slabs or moisture conveying members 16 are disposed so that when the top surface 17 is properly plowed or cultivated, the upper edges of such members 16 will be broken and thoroughly mixed with the soil and as such members contain the desired percentage of potash, this chemical is properly supplied to the propagating portion of the soil above the upper edges of the members 16.

In the systems as illustrated in Figs. 1 through 4, grass or other yearly crops are to be cultivated, the slabs 4—4', 13 and 16 being composed preferably of a greater percentage of talc and quartz, bearing potash pulverized to a flour, there being added thereto a percentage of finely ground sand, one third of the complete bulk being composed of a rich loam. These are thoroughly mixed and finally molded in the desired shapes as illustrated. With this form of moisture conveying member or mold, the greater intensity of heat from the sun's rays, the greater will be the elevation of water or moisture to the roots of the growing vegetation, the installation of the present system in the arid sections securing enough moisture to completely meet every demand as required by the growing crop. The lower ends of the respective moisture-conveying members contain preferably a large percentage of nitrogen materials of any desired character, such for instance as nitrate of soda or similar materials for the purpose of inoculating the entire body of the broken earth with nitrogen and as the moisture is elevated by capillary attraction, the nitrogen will likewise be elevated and thereby permeates the entire body from the depth broken to the top surface thereof. It is also desirable that in the form shown in Figs. 1 and 2, that the upper two rows of cross bars 5 and 5' will have mixed with their ingredients, the desired percentage of pulverized potash or a potash bearing rock and quartz which will conduct a permanent yielding of the effects of the potash to the cultivated surface above.

In the system as illustrated in Fig. 5, the same is applied for use in connection with growing of trees, either shade trees or orchards, the ground or body of earth 18 whose natural moisture level is at 19 being dug with a plurality of cylindrical pits 20 to the depth as illustrated below the level 19. These pits have disposed therein, the cylindrical molds 21 being filled with loam or earth so as to provide a proper receptacle for the roots of the trees. These pits are preferably six feet in diameter and of a sufficient depth to be below the natural moisture line. In some instances, the cross entries or moisture supplying troughs 24 will be dispensed with, and for certain trees the troughs 24, as illustrated at the left in Fig. 5 will be employed, the same in this instance being lined with the moisture conveying members 25 disposed at an equal depth to the cylindrical members 21. Thus the remaining portion of the earth is not broken, it being essential only to form the pits and the ditches or troughs for the reception of the members 21 and 25. At the right in Fig. 5 the other cross troughs 26 which are constructed similarly to the members 24 are provided, this being for trees requiring greater moisture than those in the form at the left.

For quince trees or other trees which require a great deal of moisture, the form of pit as illustrated in Fig. 7 is employed, the troughs 27 being employed in addition to the troughs 25 and 26.

It is evident that with the present system of land preparation for agriculture, that the most arid regions may be placed in such condition, that the natural moisture contained in the soil below a certain level will, due to the effects of the sun thereupon have its upper surface properly supplied with moisture so that where rain fall and surface water for irrigation cannot be secured such land can be converted into gardens to grow any character of vegetation suitable for the climate.

It is also evident that by producing the molds of materials suitable for establishing the greatest capillary attraction of water or moisture from or below the permanent moisture line to the surface, that the surface between such molds up to the top thereof will be properly supplied with moisture and that due to the cross bars, they being in contact with the moisture conveying members, moisture will be properly supplied by them to the surrounding soil and consequently to the roots of the growing vegetation. By this system during the subjection of the surface to the sun, moisture is supplied to the roots of the plants, the greater the heat, the greater the supply.

As before stated in connection with the structure shown in Fig. 4, the upper ends of the moisture conveying members 16 will extend to the upper surface of the earth, the same being pulverized and disseminated through the cultivated surface during the plowing of the cultivated surface and establishing a higher order of moisture and a higher order of affinity for moisture absorption in such surface. In the final preparation of the surface cultivated portion, a special preparation or moisture absorbent is recommended to be thoroughly worked in the earth to the plow depth of the material, such as recommended for the moisture molds or the addition of lime or any other suitable materials that will establish the highest order of moisture retaining. It is also recommended that the entire body of broken earth and especially the cultivated surface should be inoculated with germ culture adapted to the special character of vegetation to be grown. As an illustration, such as the growing of alfalfa before seeding to alfalfa, a crop of cow peas should be grown, the seed and earth being inoculated with alfalfa bacteria and being extracted from the alfalfa roots through the philosophy of bacteriology establishing cultures.

What is claimed is:

The herein described method of soil preparation which consists in loosening the soil to the region of the permanent moisture, embedding in the loose soil combined soil enriching and moisture conducting members, said members being in contact with the moist region for supplying moisture to the upper portion of the loose soil, and commingling the upper portion of said members and the top soil.

In testimony that I claim the foregoing as my own, I have hereto affixed my signature in the presence of two witnesses.

JOHN N. WINGETT.

Witnesses:
   CHAS. W. CARY,
   L. BARTLEY.

Copies of this patent may be obtained for five cents each, by addressing the "Commissioner of Patents. Washington, D. C."